May 27, 1941.    C. C. FARMER    2,243,459
BRAKE MECHANISM
Filed April 29, 1939    2 Sheets-Sheet 1
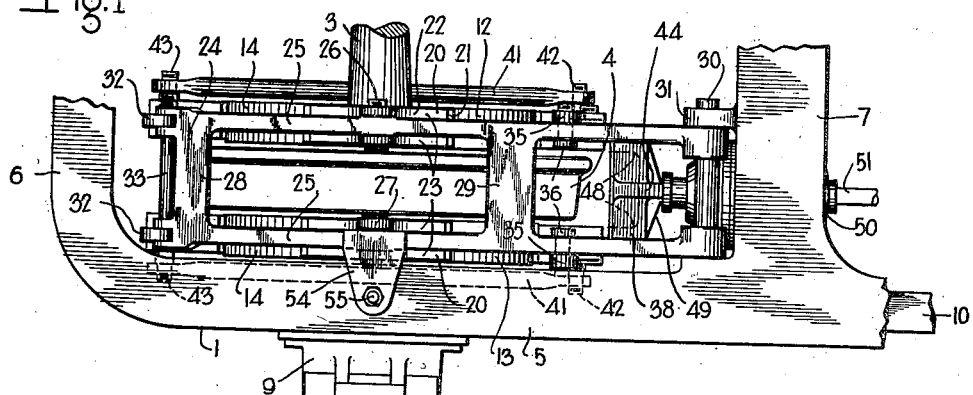
Fig.1
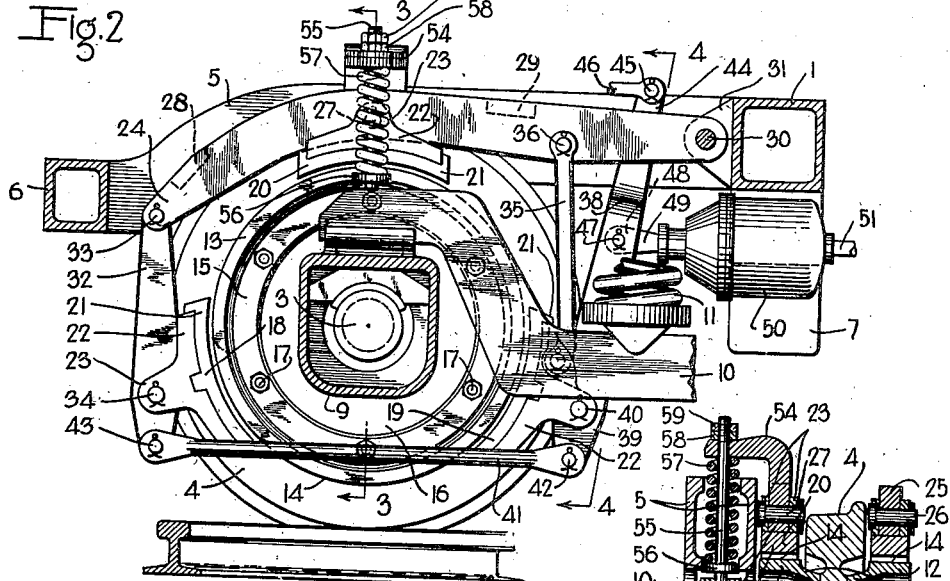
Fig.2
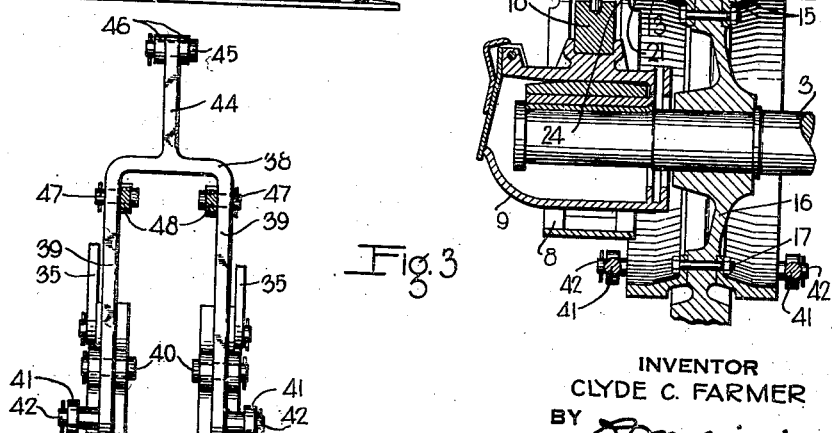
Fig.4
Fig.3
INVENTOR
CLYDE C. FARMER
BY
ATTORNEY May 27, 1941.    C. C. FARMER    2,243,459
BRAKE MECHANISM
Filed April 29, 1939    2 Sheets-Sheet 2
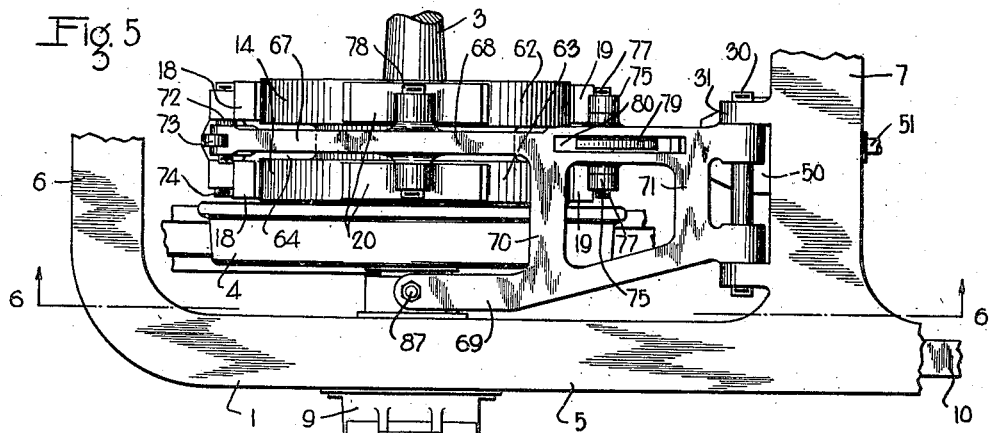
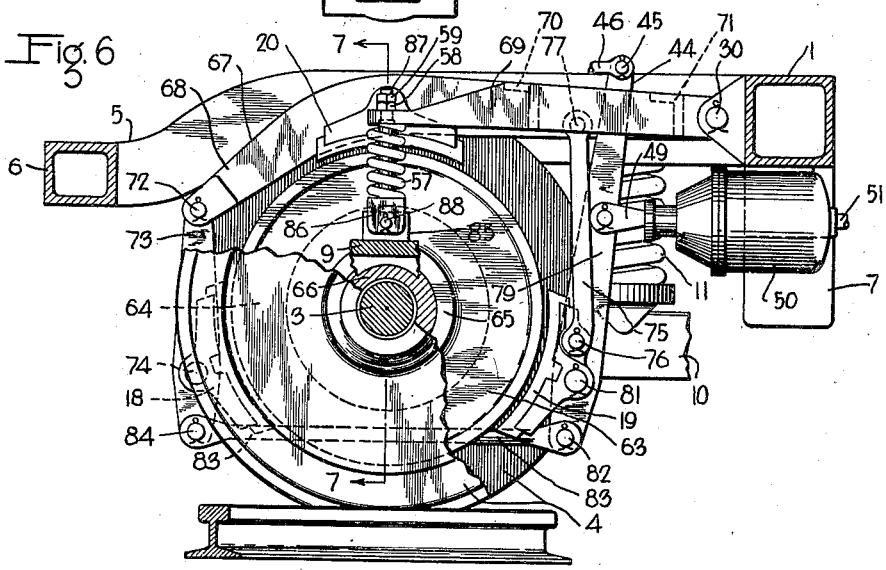
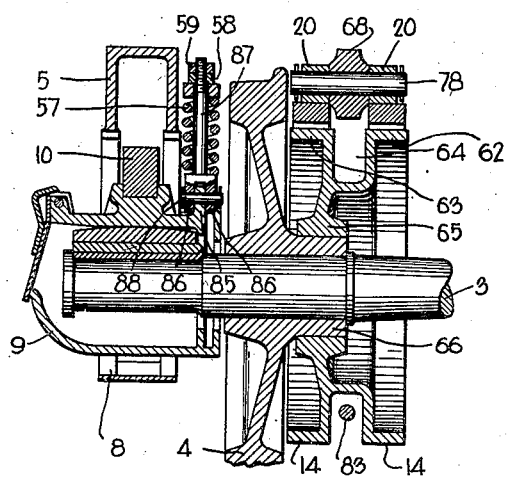
INVENTOR
CLYDE C. FARMER
BY
ATTORNEY Patented May 27, 1941

2,243,459

UNITED STATES PATENT OFFICE 2,243,459

BRAKE MECHANISM

Clyde C. Farmer, Pittsburgh, Pa., assignor to The Westinghouse Air Brake Company, Wilmerding, Pa., a corporation of Pennsylvania Application April 29, 1939, Serial No. 270,776

24 Claims. (Cl. 188—58)

This invention relates to brake mechanism for railway vehicle trucks and more particularly to the type embodying a plurality of brake elements or shoes arranged in clasp relation at opposite sides of a wheel and axle assembly and one or more additional brake elements disposed above said assembly and cooperative with the clasp arranged brake elements for braking said assembly.

In the pending application of Carlton D. Stewart, Serial No. 257,129, filed February 18, 1939, Patent No. 2,211,915, August 20, 1940, there is disclosed a brake mechanism of the above general type which comprises a brake carrier or beam extending longitudinally of the truck frame over the wheel and axle assembly and carrying a plurality of brake elements such as above described. In effecting an application of the brakes, engagement of the clasp arranged brake elements with the wheel and axle assembly operates to move the beam vertically toward said assembly to effect braking engagement between the brake elements located above the assembly and said assembly. When an application of the brakes is released means operates to elevate the beam and the brake elements to a release position in which the brake elements located above the assembly are spaced therefrom. Means are also provided which act to limit this degree of elevation so that the release position of the brake elements with respect to the wheel and axle assembly will always be the same regardless of the vertical position of the truck frame relative to said assembly.

In other words the vertical movement of the truck frame relative to the wheel and axle assembly of the truck has substantially no effect upon the release position of the carrier beam and other parts of the brake mechanism carried thereby with respect to the wheel and axle assembly of the truck so that when the brakes on the truck are released, the carrier beam and thereby the brake element or elements disposed above the assembly will be spaced substantially the same distance from the assembly for all vertical positions which the truck frame may assume with respect to the assembly.

The principal object of the present invention is to provide for use in a brake mechanism of the above general type improved and novel means which is operative when the brakes are released to support the carrier beam and parts of the brake mechanism carried thereby in a predetermined fixed relation to the wheel and axle assembly regardless of the vertical position which the truck frame may assume with respect to said assembly.

Other objects and advantages will be apparent from the following more detailed description of the invention.

In the accompanying drawings, Fig. 1 is a fragmentary plan view of a railway vehicle truck embodying one form of the invention; Fig. 2 is a side elevational view of same with a portion of the truck frame broken away; Figs. 3 and 4 are sectional views taken on the lines 3—3 and 4—4 in Fig. 2; Fig. 5 is a plan view, similar to Fig. 1, of a portion of a railway vehicle truck embodying a modified form of the invention; Fig. 6 is a view similar to Fig. 2 and taken substantially on the line 6—6 in Fig. 5; and Fig. 7 is a view similar to Fig. 3 but taken on the line 7—7 in Fig. 6.

GENERAL DESCRIPTION

As shown in the drawings, the invention is associated with a railway vehicle truck which, for the purpose of illustration, may comprise the usual truck frame 1 and longitudinally spaced wheel and axle assemblies each of which assemblies may comprise an axle 3 and laterally spaced wheels 4 secured in any desired manner to the axle 3 for rotation therewith.

The truck frame comprises side pieces 5 disposed outside of the wheels 4 and integrally connected together by transversely extending end members 6 and transoms 7. Each side frame is provided with the usual spaced depending pedestals 8 between which is slidably mounted a journal box 9 which is journaled on the end of the axle 3 outside of the wheel 4. At each side of the truck below the side pieces 5 there is provided an equalizer bar 10 extending between the wheel and axle assemblies and having its opposite ends supported on the journal boxes 9. Springs 11 are interposed between the equalizer bars 10 and truck side pieces 5 for resiliently supporting the truck frame 1 in the usual manner.

Each wheel and axle assembly of the truck may be provided with one or more of the novel brake mechanisms to be hereinafter fully described and all of these brake mechanisms may be substantially identical to each other and operate in the same manner. In view of this and for the sake of simplicity and clarity only one such brake mechanism and the necessary parts of one wheel and axle assembly and of the truck frame are shown in the drawings.

*Description of embodiment of invention shown in Figs. 1 to 4*

Referring first to the embodiment of the invention shown in Figs. 1 to 4 of the drawings. This brake mechanism comprises two like brake drums 12 and 13, the brake drum 12 being disposed adjacent the inner face of the truck wheel 4 while the brake drum 13 is disposed at the opposite side of said wheel between the wheel and side piece 5 of the truck frame. Each of the brake drums 12 and 13 is provided around the periphery with an annular braking surface 14 at one side of which there is provided an annular inturned flange 15. The web portion 16 of the truck wheel 4 is provided with an annular, thickened portion against the opposite sides of which the flanges 15 of the two brake drums 12 and 13 are mounted. A plurality of spaced bolts 17 are provided through the flanges 15 of the brake drums and the thickened portion of the wheel web 16 for rigidly securing the two brake drums to the opposite faces of the truck wheel 4 in concentric relation with said wheel.

A plurality of friction braking elements 18, 19 and 20 are provided around each of the drums 12 and 13 for frictionally engaging the surface 14 of the drum for effecting braking of the wheel 4. On each drum the brake elements 18 and 19 are disposed at opposite sides thereof below the horizontal center-line thereof in the usual clasp relation, while the third brake element 20 is located above the drum on the vertical center-line thereof.

Each of the brake elements 18, 19 and 20 may be of any desired construction, but for the purpose of illustration each comprises a brake shoe 21 having a braking face for frictional engagement with the drum. The opposite face of each of the brake shoes 21 is mounted against a carrier head 22 which is provided on its opposite face with two spaced parallel flanges 23 extending longitudinally of the elements.

Located adjacent the inner face of the side piece 5 of the truck frame and extending longitudinally thereof is a combined lever and brake rigging supporting member 24. This member is preferably in the form of a single casting comprising two laterally spaced side pieces or arms 25 one of which extends centrally over the top of each of the two brake drums 12 and 13. One of the side pieces 25 is disposed between the flanges 23 of the brake element 20 above the brake drum 12 and is pivotally connected to said element by a pin 26, while the other side piece 25 is disposed between the flanges of the brake element 20 above the drum 13 and is pivotally connected thereto by a pin 27. The two side pieces 25 are rigidly secured in spaced relation by a bridge piece 28 at one end of member 24 and a bridge piece 29 provided intermediate the ends thereof. The opposite ends of both side pieces 25 are provided with journal portions journaled on a pin 30 which is carried at one end in the side piece 5 of the truck frame and at the other end in a lug 31 projecting from the transom 7 of the truck frame.

The member 24 is provided at the end having the bridge piece 28 with two spaced pairs of ears between each of which pairs is disposed one end of a combined hanger and dead brake lever 32, these levers being pivotally connected to a pin 33 extending through said ears. The ears just described are so located that the two hangers 32, which are alike and depend from the pin 33, are located at one side of the drums 12 and 13 preferably in line with the center of the braking faces 14 of said drums. Each of the levers 32 intermediate its ends is disposed to work between the flanges 23 of one of the brake elements 18 and is pivotally connected to the said element by a pin 34.

Each of the brake elements 19 at the opposite sides of the two drums 12 and 13 is pivotally connected to one end of a hanger 35 the upper end of which is connected by a pin 36 to the member 24. The brake elements 18 and 19 and the hangers connecting said elements to the member 24 are so arranged that the force of gravity acting on said elements will effect movement thereof away from the braking surfaces 14 of the brake drums to their release position shown, in the usual manner.

A live brake lever 38 is provided at the side of the brake drums opposite the dead levers 32 and comprises two spaced parallel arms 39 one of which extends between and is pivotally connected by a pin 40 to the flanges 23 of each of the brake elements 19. Each of the arms 39 extends below the pin 40 and is connected to one end of a tie rod 41 by a pin 42, the opposite end of the tie rod being pivotally connected by a pin 43 with the lower end of one of the dead brake levers 32. It will be noted that one of the tie rods 41 is disposed adjacent to and extends across the outer face of the brake drum 12 while the other tie rod is similarly disposed with respect to the outer face of the brake drum 13.

The upper ends of the two arms 39 of the live brake lever 38 are operatively connected together and to a vertically extending arm 44 the upper end of which is connected by a pin 45 to one end of an operating element 46. This element is a part of the usual hand brake mechanism employed on railway vehicles and may be connected by means (not shown) to the usual hand operative brake wheel whereby the live brake lever 38 and other parts of the brake mechanism may be operated by hand to apply the brakes on the truck in a manner which will be apparent from the description to follow.

Adjacent the arm 44 the two arms 39 of the live brake lever 38 are pivotally connected by pins 47 to the bifurcated end 48 of a push rod 49 projecting from a brake cylinder device 50 which is rigidly secured to any suitable part of the truck frame, such as transom 7.

The brake cylinder device 50 may be of any desired construction comprising a piston or the like (not shown) adapted to be operated by fluid under pressure for effecting movement of the push rod 49 outwardly of the device for thereby effecting movement of the upper end of the live lever 38 in the direction of wheel 4 as viewed in Fig. 2 of the drawings, and operative upon the release of fluid under pressure to permit movement of said lever in the reverse direction. The brake cylinder device is connected to a pipe 51 through which fluid under pressure is adapted to be supplied to and released from said device for controlling its operation.

The side piece 25 of member 24 which is adjacent the side piece 5 of the truck frame 1 is provided directly over the pivot pin 27 with an upwardly extending bracket 54 the upper end portion of which is bent outwardly over the side piece 5 of the truck frame. The bracket 54 is provided in its upper end with a vertical bore directly over the truck equalizer bar 10, and extending through this bore and suitable openings in the side piece 5 of the truck frame is a strut pin 55, its lower end being disposed in a pocket provided in the truck equalizer bar 10.

Adjacent the truck equalizer bar 10 the strut pin 55 is provided with an annular collar 56 between the upper face of which and the lower face of the bracket 54 is interposed a spring 57. This spring acting on the bracket 54 and thus on the member 24 is provided for supporting said member and the parts of the brake mechanism connected thereto which includes the brake elements 18, 19 and 20, from the truck equalizer bar 10, when said brake elements are in their release position, shown in the drawings. The truck frame 1 is thus capable of vertical movement relative to the wheel and axle assembly without affecting the positioning of the several brake elements and other parts of the brake mechanism with respect to said assembly.

The strut pin 55 is provided at its upper end with an adjusting nut 58 engaging the bracket 54 for adjusting the vertical position in which the spring 57 supports the member 24 and for thus adjusting the clearance space between the brake elements 20 and the brake drums when said brake elements are in their release position shown. A lock nut 59 is provided on the end of the strut pin for engagement with the adjusting nut 58 for holding same in an adjusted position.

The outwardly extending end portion of the bracket 54 is spaced from the top surface of the side piece 5 of the truck frame a sufficient distance to prevent engagement between the truck frame and bracket throughout the usual vertical range of movement of the truck frame relative to the truck wheels and equalizer bar 10 and thus relative to the bracket 54.

*Operation of embodiment of invention shown in Figs. 1 to 4*

With the various parts of the brake mechanism in their brake release positions shown, if it is desired to effect an application of the brakes on the truck, fluid under pressure is supplied through the pipe 51 to the brake cylinder device 50 and acts therein to effect movement of the brake cylinder piston 4 outwardly of the device in the usual manner. The live lever 38 is thereby rocked in a counterclockwise direction, as viewed in Fig. 2 of the drawings, and acts through the tie rods 41 to rock the dead levers 32 about their pivotal connections with the member 24 in a like direction. This rocking of the live brake lever 38 and dead levers 32 acts to effect movement of the brake elements 19 and 18 toward and into engagement with the brake drums 12 and 13.

Due to the fact that the brake elements 18 and 19 engage the brake drums below the horizontal center-lines thereof and also due to the fact that the actuating pressure applied through the brake levers to said elements acts in a direction below the axis of said drums, a component of said actuating pressure forces said brake elements downwardly around the brake drums toward each other. As the brake elements 18 and 19 are thus forced downwardly around the brake drums 12 and 13, they act through the dead brake levers 32 and hangers 35 to rock the member 24 about the pivot pin 30 and against the resistance of spring 57 in the direction of said drums, thereby effecting movement of the brake elements 20 in a downwardly direction and into engagement with said drums. After the brake elements 20 have thus been pulled into engagement with the brake drums, the pressure of fluid further supplied to the brake cylinder device 50 increases the pressure of the brake elements 18 and 19 against the brake drums which results in an increased downward pulling force on the beam 24 which increases the pressure of the brake elements 20 against the drums. The brake drums and wheel 4 are thus braked by the cooperative action of the clasp arranged brake elements 18 and 19 and the additional brake elements 20, and the degree of this braking depends upon the pressure of fluid supplied to act in the brake cylinder device 50, which may be varied in the usual well known manner.

When an application of the brakes is effected it will be noted that the downward movement of the brake elements 18 and 19 to effect braking engagement between the brake elements 20 and the brake drums is opposed by the pressure of the spring 57. The pressure of this spring is however only sufficient to support the brake mechanism out of engagement with the brake drums when the brakes are released, and therefore relatively small as compared to the forces employed for effecting braking engagement between the several brake elements and the drums, due to which said spring has no material adverse effect upon the degree of braking obtained by the operation of the brake cylinder device 50.

When the brakes are applied it will be noted that the bracket 54 is moved downwardly from its normal position toward the upper surface of the side piece 5 of the truck frame. This movement is however insufficient to obtain engagement between the bracket and truck frame, regardless of the vertical position which the truck frame may be in at the time the brakes are applied, as governed by the loaded condition of the vehicle carried by the truck.

The only connection between the brake mechanism and the truck frame is through the pivot pin 30 at the end of the member 24 and the only purpose of this connection is to hold said member and thereby the several brake elements against turning with the brake drums when the brakes are applied. This connection however has no material influence upon the springing of the truck frame so that with the brakes applied the truck frame is substantially as free to move vertically relative to the brake mechanism as when the brakes are released.

In order to effect a release of the brakes after an application fluid under pressure is vented from the brake cylinder device 50 through the pipe 51 thereby relieving the pressure of said device on the live lever 38 and through the tie rods 41 on the dead levers 32. This permits the force of gravity acting on the brake elements 19 and 18 to rock said brake elements out of engagement with the brake drums 12 and 13. While the brake elements 18 and 19 are thus being released from the brake drums the spring 57 acting on the bracket 54 rocks the member 24 about the pivot pin 30 in a clockwise direction thus lifting the brake elements 20 away from the brake drums and back to their release position shown in the drawings. The degree of this lifting is limited by engagement of the bracket 54 with the adjusting nut 58 provided on the strut pin 55, which nut thus acts to define the release positions of the brake elements 20 as before described and in which positions said brake elements are spaced away from the brake drum a chosen distance, such as shown in the drawings. As the member 24 is thus operated to elevate the brake elements 20 to their release positions, it will be evident that through the medium of the dead levers 32 and hangers 35, the brake elements 19 and 20 are also lifted to their release positions.

It will now be evident that the support spring 57 yields to permit movement of the brake elements 20 into braking engagement with the brake drums in effecting an application of the brakes, and acts in releasing the brakes after an application to elevate the brake mechanism back to its release position, such movement being independent of and relative to the truck frame, whereby the release position of the beam 24 and brake elements 20 with respect to the brake drums 12 and 13 will always be the same regardless of the vertical position of the truck frame with respect to the wheel and axle assembly.

It will be further noted that since the brake mechanism is supported directly on an unsprung portion of the truck, i. e. the equalizer bar 10 in the present embodiment of the invention, said mechanism has substantially no effect upon vertical movement of the truck frame 1 relative to the wheel and axle assembly, so that the truck frame support spring 11 is substantially as effective when the brakes are applied as when released.

*Description of embodiment of invention shown in Figs. 5 to 7*

In the modified form of the invention shown in Figs. 5 to 7 of the drawings, two brake drums 62 and 63 having annular braking surfaces 14 are provided encircling the axle 3 adjacent the inner face of the wheel 4. These drums 62 and 63 are preferably integrally formed with an annular space 64 provided between the drums and with a hub portion 65 which is mounted on and secured to an extension 66 of the hub of the truck wheel 4 in concentric relation with said wheel and for rotation therewith. Three brake elements 18, 19 and 20 are arranged around each of the drums 62 and 63 for braking engagement therewith in the same positions as occupied by like elements described in connection with the embodiment of the invention shown in Figs. 1 to 4.

A combined lever and brake rigging support member 67, corresponding functionally to the member 24 above described, extends longitudinally of the truck frame over the brake drums 62 and 63. This member 67 comprises two spaced arms 68 and 69, the arm 68 being disposed directly over the space 64 provided between the brake drums 62 and 63. The arm 69 is disposed at the opposite side of the truck wheel 4 between said wheel and the side piece 5 of the truck frame, the end of the arm 69 terminating directly over the inner end of the journal box 9.

The two arms 67 and 69 are rigidly connected together by two spaced bridge-like pieces 70 and 71, and are provided adjacent the truck transom 7 with journal portions mounted on the pivot pin 30. The end of arm 68 opposite pivot pin 30 is pivotally connected by a pin 72 to the upper end of a dead brake lever 73 which extends downwardly between the two brake elements 18 and which is pivotally connected to both of said brake elements by a pin 74.

At the opposite side of the brake drums a hanger 75 is pivotally connected at its lower end by a pin 76 to each of the brake elements 19. The upper end of the two hangers 75 are disposed at opposite sides of the arm 68 of member 67 and each is pivotally connected thereto by a pin 77. Directly over the brake drums the arm 68 of member 67 extends between the two brake elements 20 and is pivotally connected to said elements by a pin 78.

A live brake lever 79 having its upper end disposed to operate in a slot 80 provided in the member 67 extends downwardly between the brake elements 19 and is pivotally connected to said elements intermediate its ends by a pin 81. The lower end of the live lever 79 is connected by a pin 82 to one end of a tie rod 83 which extends through the space 64 between the brake drums and which is connected at its opposite end by a pivot pin 84 to the lower end of the dead lever 73. The live lever 79 is connected to the piston rod 49 of the brake cylinder device 50 for operation thereby in the same manner as described in connection with the first embodiment of the invention.

The journal box 9 is provided at its inner end directly over the axis of the axle 3 with an upstanding flange 85 which fits between two jaws 86 provided on the lower end of a strut pin 87, the jaws 86 being pivotally connected to the flange 85 by a transversely extending pin 88. The strut pin 87 extends upwardly from the journal box and through a suitable aperture provided in the end of the arm 69 of member 67. A spring 57 encircling pin 87 is interposed between the end thereof provided with the jaws 86 and the lower face of arm 69, while an adjusting nut 58 and lock nut 59 are provided on said pin above the arm 69 for engagement by said arm.

*Operation of the embodiment of the invention shown in Figs. 5 to 7*

The operation of the brake mechanism disclosed in Figs. 5 to 7 of the drawings is substantially the same as that disclosed in Figs. 1 to 4, it being evident that in effecting an application of the brakes, the spring 57 is adapted to yield to permit movement of the brake elements 20 into braking engagement with the brake drum, while in effecting a release of the brakes, said spring is adapted to move the member 67 and the brake mechanism carried thereby in a vertical direction relative to the truck frame until the brake elements 20 obtain their release positions in which said brake elements are shown in the drawings and which positions are defined by engagement of the member 67 with the adjusting nut 58.

It will be evident that the release positions of the brake elements 20 are independent of vertical movement of the truck frame so that when the brakes are released the brake elements 20 will be spaced the same distance from the brake drums in all vertical positions which the truck frame may assume with respect to the wheel and axle assembly. The only connection between the brake mechanism and truck frame is through the torque pin 30 which however has substantially no effect upon the springing of the truck frame as hereinbefore pointed out in the description of the structure disclosed in Figs. 1 to 4 of the drawings.

SUMMARY

It will be noted that in both embodiments of the invention means are provided which act, when the brakes are released, to support the brake mechanism directly from an unsprung part of the truck in a predetermined relation with respect to the brake drums which are adapted to be braked. Except for the torque connection through pin 30 with the truck frame this support of the brake mechanism is entirely independent of the truck frame which therefore is substantially as free for vertical movement when the brakes on the truck are applied as when released.

It is important to note however that since the supporting means for the brake mechanism is adapted to hold same in a chosen relation to the brake drums when the brakes are released, which relation is independent of vertical movement of the truck frame, said mechanism will always become effective after a certain substantially invariable movement of the brake elements 20, regardless of the vertical disposition of the truck frame, and this is very desirable in order to provide for the most efficient and responsive braking of the truck.

While two illustrative embodiments of the invention have been described in detail it is not the intention to limit the scope to these embodiments or otherwise than by the terms of the appended claims.

Having now described my invention, what I claim as new and desire to secure by Letters Patent, is:

1. A brake mechanism for a vehicle truck having a wheel and axle assembly, a journal bearing on said assembly, and a truck frame comprising a side piece secured to said bearing and being capable of movement vertically relative to said bearing, said mechanism comprising a member secured against rotation and having a brake release position and being movable therefrom relative to said side piece in the direction of said assembly for effecting braking thereof, actuating means for moving said member, a vertically arranged spring extending through said side piece and supported on said journal bearing, means connecting the upper end of said spring to said member, said spring being operative to support said member in said brake release position and to provide for movement of said member by said actuating means in the direction of said assembly for effecting an application of the brakes.

2. A brake mechanism for a vehicle truck having a wheel and axle assembly, a journal bearing on said assembly, and a truck frame comprising a side piece secured to said bearing and being capable of movement vertically relative to said bearing, said mechanism comprising a member secured against rotation with said assembly and having a brake release position and being movable therefrom relative to said side piece in the direction of said assembly for effecting braking thereof, actuating means for moving said member, a vertically arranged spring extending through said side piece and supported on said journal bearing, a bracket extending from said member over the top of said side piece and spaced therefrom, said spring acting on said bracket for normally supporting said member in said brake release position and for rendering said member movable by said actuating means.

3. A brake mechanism for a vehicle truck having a wheel and axle assembly, a journal bearing on said assembly, and a truck frame comprising a side piece secured to said bearing and being capable of movement vertically relative to said bearing, said mechanism comprising a member secured against rotation with said assembly and having a brake release position and being movable therefrom relative to said side piece in the direction of said assembly for effecting braking thereof, actuating means for moving said member, and a spring supported by the inner end of said journal bearing adjacent the inner face of said side piece and bearing at its upper end on said member for normally supporting said member in said brake release position and operative to render said member movable in the direction of said assembly by said actuating means.

4. A brake mechanism for a vehicle truck having a wheel and axle assembly, a bearing on said assembly, an equalizer bar at one side of said truck carried by said bearing, a truck frame, and a spring carried by said equalizer bar for supporting said frame, said brake mechanism comprising a member disposed above the axis of said assembly and movable from a brake release position in a downwardly direction to effect braking of said assembly, means securing said member against rotation with said assembly, means for actuating said member to effect braking of said assembly, and a spring supported on said equalizer bar and acting on said member for supporting said member in said brake release position and for rendering said member movable by said actuating means.

5. A brake mechanism for a vehicle truck having a wheel and axle assembly, a bearing on said assembly, an equalizer bar at one side of said truck carried by said bearing, a truck frame, and a spring carried by said equalizer bar for supporting said frame, said brake mechanism comprising a member disposed above the axis of said assembly and movable from a brake release position in a downwardly direction to effect braking of said assembly, means securing said member against rotation with said assembly, means for actuating said member to effect braking of said assembly, and a spring extending vertically through one side of said truck frame and supported on said equalizer bar directly over said bearing, and means operatively connecting the opposite end of said spring to said member for supporting said member in said brake release position and for rendering said member movable by said actuating means.

6. In a vehicle truck in combination, a rotatable member to be braked provided with an annular braking surface, a truck frame capable of vertical movement relative to said member, a beam extending longitudinally of said truck over said surface and having one end fulcrumed to said frame, a brake element disposed on the vertical center-line of said rotatable member and carried by said beam, means for actuating said beam for moving said brake element into frictional braking engagement with said surface, a spring carried by an unsprung portion of said truck and operative on said beam to move said brake element to and to support same in a position disengaged from said surface, said spring being yieldable to permit movement of said beam by said actuating means, and means for limiting the operation of said spring to move said brake element away from said surface for thereby regulating the clearance space between said brake element and surface.

7. A brake mechanism for a vehicle truck having a rotatable member to be braked provided with an annular braking surface and having a truck frame capable of vertical movement relative to said member, said mechanism comprising a beam extending longitudinally of said truck over said surface and having one end fulcrumed to said frame, a brake element disposed on the vertical center-line of said rotatable member and carried by said beam, means for actuating said beam for moving said brake element into frictional braking engagement with said surface, a spring interposed between and acting on an unsprung portion of said truck and said member for moving said member and thereby said brake element out of engagement with said surface and for rendering same movable by said actuating means, a rod secured at one end to said unsprung portion of the truck and extending through said member, and an adjusting nut on said rod engaging said member for limiting movement of said brake element away from said surface by said spring.

8. A brake mechanism for a vehicle truck having a wheel and axle assembly, a journal bearing on said assembly and a truck frame carried by said bearing and capable of vertical movement relative to said assembly, said brake mechanism comprising a beam having at one end a fulcrum connection with said frame and extending over the axis of said assembly longitudinally of said truck, a brake element disposed above the axis of said assembly on the vertical center-line thereof and connected to said beam for movement therewith, a pair of brake elements arranged at opposite sides of said assembly in clasp relation and adapted to frictionally engage said assembly below the horizontal center-line thereof, means connecting the clasp arranged brake elements to said beam, means for actuating the clasp arranged brake elements into braking engagement with said assembly for thereby effecting rocking of said beam relative to said truck frame to move the first named brake element into braking engagement with said assembly, and resilient means disposed above and supported on said journal bearing and acting on said beam for releasing the first named brake element from said beam upon release of said clasp arranged brake elements from said beam, said spring being operative to render said beam movable by said actuating means.

9. A brake mechanism for a vehicle truck having a wheel and axle assembly, a journal bearing on said assembly and a truck frame carried by said bearing and capable of vertical movement relative to said assembly, said brake mechanism comprising a beam having at one end a fulcrum connection with said frame and extending over the axis of said assembly longitudinally of said truck, a brake element disposed above the axis of said assembly on the vertical center-line thereof and connected to said beam for movement therewith, a pair of brake elements arranged at opposite sides of said assembly in clasp relation and adapted to frictionally engage said assembly below the horizontal center-line thereof, means connecting the clasp arranged brake elements to said beam, means for actuating the clasp arranged brake elements into braking engagement with said assembly for thereby effecting rocking of said beam relative to said truck frame to move the first named brake element into braking engagement with said assembly, a vertically acting spring disposed on the vertical center-line of said journal bearing and carried by said bearing, and a member projecting from said beam transversely of said truck and engaging the upper end of said spring, said spring being operative through said member to support said brake mechanism from said journal bearing when said brake elements are released from said assembly and to render said beam and thereby the brake elements secured thereto movable in a vertical direction relative to said frame into braking engagement with said surface upon operation of said clasp brake elements by said actuating means.

10. A brake mechanism for a vehicle truck having a wheel and axle assembly, a journal bearing on said assembly outboard of a wheel of said assembly, and a truck frame comprising a side piece slidably mounted on said journal bearing and capable of movement relative to said assembly in a vertical direction, said brake mechanism comprising a brake drum disposed at one side of and secured to rotate with said wheel, a beam extending longitudinally of said truck frame over said brake drum and having at one end a fulcrum connection with said frame, a brake element disposed above said drum on the vertical center-line thereof and carried by said beam, actuating means for rocking said beam relative to said frame for moving said brake element into braking engagement with said drum, a vertically acting spring disposed above the axis of said assembly and carried by said journal bearing, and a bracket extending from said beam transversely of said truck and engaged by said spring, said spring being operative through said bracket to support said brake element in a position disengaged from said drum and to render said beam operative by said actuating means.

11. A brake mechanism for a vehicle truck having a wheel and axle assembly, a journal bearing on said assembly and a truck frame comprising a side piece slidably mounted on said journal bearing and capable of vertical movement relative to said assembly, a brake element disposed above the axis of said assembly at one side of said journal bearing, a member disposed above the axis of said assembly and extending longitudinally of the truck and having one end pivotally connected to said frame, said member carrying said brake element and being rockable relative to said frame to move said brake element into braking engagement with said assembly, means for actuating said member, a vertically acting spring disposed above and supported by said journal bearing, and an arm projecting from said member into vertical alignment with said spring and engaged thereby, said spring being operative to oppose rocking movement of said member by said actuating means and being also operative to move said brake element out of braking engagement with said assembly upon release of said actuating means.

12. A brake mechanism for a vehicle truck having an axle, a wheel on said axle, a journal bearing on said axle and a truck frame comprising a side piece disposed at one side of said wheel and slidably mounted on said journal bearing and capable of vertical movement relative to said wheel and axle, said brake mechanism comprising a brake drum disposed at one side of said wheel and secured to rotate therewith, a brake element disposed above said drum and adapted to be moved into braking engagement therewith, a member disposed above said brake element and extending longitudinally of said truck, said member being pivotally connected at one end to said truck frame and carrying said brake element, actuating means operative to rock said member relative to said truck frame for effecting movement of said brake element into braking engagement with said drum, and a vertically acting spring disposed above and carried by said journal bearing and acting on said member for supporting said brake element out of engagement with said drum and providing for movement of said member by said actuating means.

13. A brake mechanism for a vehicle truck having an axle, a wheel on said axle, a journal bearing on said axle and a truck frame comprising a side piece disposed at one side of said wheel and slidably mounted on said journal bearing and capable of vertical movement relative to said wheel and axle, said brake mechanism comprising a brake drum disposed at one side of said wheel and secured to rotate therewith, a brake element disposed above said drum and adapted to be moved into braking engagement therewith, a member disposed above said brake element and extending longitudinally of said truck, said member being pivotally connected at one end to said truck frame and carrying said brake element, actuating means operative to rock said member relative to said truck frame for effecting movement of said brake element into braking engagement with said drum, and a spring disposed above and supported on said journal bearing, said member having an arm projecting therefrom transversely of the truck and engaged by said spring, said spring being operative on said arm to support said member in a position for disengaging said brake element from said drum and being also operative to provide for rocking movement of said member upon operation of said actuating means.

14. A brake mechanism for a vehicle truck having an axle, a wheel on said axle, a journal bearing on said axle and a truck frame comprising a side piece disposed at one side of said wheel and slidably mounted on said journal bearing and capable of vertical movement relative to said wheel and axle, said brake mechanism comprising a brake drum disposed at one side of said wheel and secured to rotate therewith, a brake element disposed above said drum and adapted to be moved into braking engagement therewith, a member disposed above said brake element and extending longitudinally of said truck, said member being pivotally connected at one end to said truck frame and carrying said brake element, actuating means operative to rock said member relative to said truck frame for effecting movement of said brake element into braking engagement with said drum, a spring disposed above said journal bearing and carried thereby and extending vertically through openings in the side piece of said truck frame, and an arm projecting from said member transversely of said truck and over said side piece and engaged by said spring, said spring being operative through said arm to support said member and brake element in a position in which said brake element is disengaged from said drum and being also operative to permit rocking movement of said member upon operation of said actuating means.

15. A brake mechanism for a vehicle truck having an axle, a wheel on said axle, a journal bearing on said axle at one side of said wheel and a truck frame comprising a side piece slidably mounted on said journal bearing and capable of vertical movement relative to said wheel and axle, said brake mechanism comprising a pair of spaced brake drums secured to rotate with said wheel in concentric relation therewith, a brake element disposed above each of said brake drums and adapted to be moved into braking engagement therewith, a member pivotally connected at one end to said frame and extending longitudinally of said truck over said drums, means connecting both of said brake elements to said member, means for actuating said member relative to said truck frame for effecting movement of said brake elements into engagement with said drums, a spring disposed above and carried by said journal bearing, and an arm projecting from said member transversely of said truck and engaged by said spring, said spring being operative through said arm to support said member and thereby said brake elements in a position in which said brake elements are disengaged from said drums and for resiliently opposing movement of said member by said actuating means.

16. A brake mechanism for a vehicle truck having an axle, a wheel on said axle, a journal bearing on said axle at one side of said wheel and a truck frame comprising a side piece slidably mounted on said journal bearing and capable of vertical movement relative to said wheel and axle, said brake mechanism comprising a pair of brake drums secured to rotate with said wheel in concentric relation therewith, a brake element disposed above each of said drums for braking engagement therewith, a member extending longitudinally of said truck frame and pivotally connected at one end to said frame, said member comprising an arm extending over said drums and carrying said brake elements, means operative on the other end of said member for actuating same to move said brake elements into braking engagement with said drums, said member having another arm which is off-set from the first named arm and which extends directly above said journal bearing, and a spring supported on said journal bearing and acting on said off-set arm for normally supporting said arms and brake elements in the position in which said elements are disengaged from said drums and for permitting movement of said arms and brake elements by said actuating means.

17. A brake mechanism for a vehicle truck having an axle, a wheel on said axle, a journal bearing on said axle at one side of said wheel and a truck frame comprising a side piece slidably mounted on said journal bearing and capable of vertical movement relative to said wheel and axle, said brake mechanism comprising a pair of brake drums secured to rotate with said wheel in concentric relation therewith, a brake element disposed above each of said drums for braking engagement therewith, a member comprising two spaced, integrally connected arms pivotally connected at one end to said frame, one of said arms being disposed centrally over each of said drums and carrying the brake element for engaging the drum, actuating means operatively connected to said member for effecting movement thereof and thereby of said brake elements relative to said frame into braking engagement with said drums, said member having a bracket extending transversely of the truck frame and over said journal bearing, and a spring carried by said journal bearing and acting on said bracket for normally supporting said member and thereby said brake elements in a position in which said brake elements are disengaged from said brake drums and for permitting movement of said member and brake elements by said actuating means.

18. A brake mechanism for a vehicle truck having an axle, a wheel secured to said axle, a journal bearing mounted on said axle outside of said wheel, a truck frame comprising a side piece slidably mounted on said journal bearing and capable of vertical movement relative to said wheel and axle, said brake mechanism comprising a brake drum disposed at either side of said wheel with one of said drums between said wheel and side piece, means securing both of said drums to rotate with said wheel in concentric relation therewith, a brake element disposed above each of said drums, a vertically movable member pivotally connected at one end to said frame and comprising two parallel side pieces rigidly connected together and extending longitudinally of said truck frame with one of said side pieces disposed at either side of said wheel and passing centrally over the brake drum secured to the wheel, each of said two parallel side pieces carrying one of said brake elements, actuating means operative on said member for rocking same relative to said frame to move said brake elements into braking engagement with said drums, a spring disposed above and carried by said journal bearing, and a bracket projecting from said member and engaged by said spring, said spring being operative through said bracket to support said member and thereby said brake elements in a position in which said elements are disengaged from said drums and for permitting movement of said elements into engagement with said drums upon operation of said actuating means.

19. A brake mechanism for a vehicle truck having an axle, a wheel secured to said axle, a journal bearing on said axle outboard of said wheel, a truck frame comprising a side piece slidably mounted on said journal bearing and capable of vertical movement relative to said wheel and axle, said brake mechanism comprising two spaced, connected brake drums disposed inboard of said wheel and secured to rotate with said wheel in concentric relation therewith, a brake element disposed above each of said drums for braking engagement therewith, a rockable member pivotally connected at one end to said frame and extending over said drums and carrying said brake elements, actuating means connected to said member for rocking same relative to said frame to move said brake elements into braking engagement with said drums, a vertically acting spring disposed above and carried by said journal bearing, and a rigid member extending from said rockable member and engaged by said spring, said spring being operative through said rigid member to support said rockable member and brake elements in a position in which said brake elements are disengaged from said drums and for permitting movement of said rockable member and brake elements by said actuating means.

20. A brake mechanism for a vehicle truck having a wheel and axle assembly and a truck frame carried by said assembly and capable of vertical movement relative thereto, said brake mechanism comprising a plurality of brake elements arranged in three sets disposed around the axis of said assembly for effecting braking thereof, two of said sets of brake elements being disposed at opposite sides of said axis and below the horizontal center-line of said assembly in clasp relation, and the third set of brake elements being disposed above the axis of said assembly on the vertical center-line thereof, a rigid structure pivotally connected at one end to said frame and extending longitudinally of said frame over the axis of said assembly centrally of said third set of brake elements, means securing said third set of brake elements to said structure for movement therewith, a dead brake lever connected to the opposite end of said structure and to one of the clasp arranged sets of brake elements, a live brake lever at the opposite side of said assembly connected to the other set of clasp arranged brake elements, tie rod means connecting said levers, a brake cylinder device secured to said frame and operatively connected to said live lever for actuating both of said levers to effect movement of said sets of clasp arranged brake elements into braking engagement with said assembly, and a spring carried by said journal bearing and acting on said structure for normally supporting said structure, levers and sets of brake elements in a position in which said third set of brake elements are disengaged from said assembly and for permitting rocking of said structure and thereby movement of the said third set of brake elements into braking engagement with said assembly upon operation of said brake cylinder device.

21. A brake mechanism for a vehicle truck having a wheel and axle assembly and a truck frame carried by said assembly and capable of vertical movement relative thereto, said brake mechanism comprising a plurality of brake elements arranged in three sets disposed around the axis of said assembly for effecting braking thereof, two of said sets of brake elements being disposed at opposite sides of said axis and below the horizontal center-line of said assembly in clasp relation, and the third set of brake elements being disposed above the axis of said assembly on the vertical center-line thereof, a rigid structure pivotally connected at one end to said frame and extending longitudinally of said frame over the axis of said assembly centrally of said third set of brake elements, means securing said third set of brake elements to said structure for movement therewith, a dead brake lever connected to each of the clasp brake elements of one set and to the other end of said structure, a live brake lever disposed at the opposite side of said assembly comprising two integrally connected arms connected to the clasp brake elements in the other set, tie rod means connecting said arms to said dead brake levers, a brake cylinder device operatively connected to both of said arms for actuating same and said dead brake levers for effecting movement of said sets of brake elements into braking engagement with said assembly, and spring means supported by said journal bearing and acting on said structure for normally supporting said structure, said levers and arms and thereby said sets of brake elements in a position in which said third set of brake elements are disengaged from said assembly, said spring being operative to permit rocking of said structure relative to said frame to permit engagement of said third set of brake elements with said assembly upon operation of said brake cylinder device.

22. A brake mechanism for a railway vehicle truck having sprung and unsprung parts and a rotatable member included in said unsprung parts and provided with an annular braking surface, said mechanism comprising at least three brake elements arranged in spaced relation with respect to each other around said rotatable member and adapted to be moved into and out of frictional braking engagement with said surface for controlling the braking of said truck, means for controlling the operation of said brake elements, means connecting said brake elements to a sprung part of the truck for holding same against turning with said rotatable member and means connecting said brake elements to an unsprung part of said truck for at all times supporting same independently of the sprung parts of said truck.

23. A brake mechanism for a railway vehicle truck having sprung and unsprung parts and a rotatable member included in said unsprung parts and provided with an annular braking surface, said brake mechanism comprising at least three brake elements arranged in spaced relation with respect to each other around said rotatable member and adapted to be moved into braking engagement with said surface for braking said truck, means for controlling the operation of said brake elements, means for at all times supporting said brake elements from an unsprung part of said truck independently of said sprung parts of said truck, and substantially horizontally acting means connecting said brake mechanism with a sprung part of said truck for holding said brake elements against rotation with said rotatable member when in braking engagement therewith.

24. A brake mechanism for a wheel and axle assembly of a railway vehicle truck having a truck frame carried by said assembly and capable of movement relative to said assembly in a vertical direction, said mechanism comprising at least three brake elements arranged in spaced relation with respect to each other around the axis of said assembly, said brake elements being movable in the direction of said axis for effecting braking of said assembly and being movable in the opposite direction to release positions for releasing the brakes on said assembly, an unsprung part carried by said assembly, means connecting said brake elements to said unsprung part for supporting same independently of said truck frame when in said release positions, means for controlling the operation of said brake elements, and means connecting said brake elements to said frame for securing same against turning with said assembly.

CLYDE C. FARMER.